US008801930B2

(12) United States Patent
Qiu (10) Patent No.: US 8,801,930 B2
(45) Date of Patent: Aug. 12, 2014

(54) METHOD AND APPARATUS OF SOLID WASTES AUTOMATIC COLLECTION DUCTWORK EVACUATION AND COMPREHENSIVE UTILIZATION

(76) Inventor: Zeguo Qiu, Scarborough (CA)

( * ) Notice: Subject to any disclaimer, the term of this patent is extended or adjusted under 35 U.S.C. 154(b) by 37 days.

(21) Appl. No.: 12/504,657

(22) Filed: Jul. 16, 2009

(65) Prior Publication Data

US 2010/0243559 A1    Sep. 30, 2010

(30) Foreign Application Priority Data

Mar. 26, 2009  (CN) .......................... 2009 1 0106173
Mar. 26, 2009  (CN) ....................... 2009 2 0136197 U (51) Int. Cl.
*C02F 3/28*      (2006.01)
*C05F 9/00*      (2006.01)
*C02F 11/04*     (2006.01)

(52) U.S. Cl.
USPC ............... 210/603; 71/10; 210/609; 210/143; 210/173; 210/259

(58) Field of Classification Search
USPC ................. 210/603, 609, 173, 252, 259, 143; 71/10, 14, 19, 20, 23
See application file for complete search history.

(56) References Cited

U.S. PATENT DOCUMENTS

| | | | | | |
|---|---|---|---|---|---|
| 5,423,532 | A | * | 6/1995 | Huang | 473/533 |
| 5,527,464 | A | * | 6/1996 | Bartha et al. | 210/603 |
| 6,106,716 | A | * | 8/2000 | Berkman | 210/603 |
| 6,682,578 | B2 | * | 1/2004 | Sower | 71/11 |
| 7,108,788 | B2 | * | 9/2006 | Chang et al. | 210/601 |
| 2004/0206698 | A1 | * | 10/2004 | Chang et al. | 210/603 |
| 2006/0037898 | A1 | * | 2/2006 | Choi | 210/173 |
| 2006/0289356 | A1 | * | 12/2006 | Burnett et al. | 210/603 |
| 2007/0102355 | A1 | * | 5/2007 | Steinbeck | 210/620 |
| 2008/0164191 | A1 | * | 7/2008 | Bryan-Brown | 210/173 |

FOREIGN PATENT DOCUMENTS

JP         2000-24630 A    *  1/2000

OTHER PUBLICATIONS

Machine-generated English translation JP 2000-24630 A. Generated Mar. 2011.*

* cited by examiner

*Primary Examiner* — Fred Prince (57) ABSTRACT

The method and apparatus for the solid wastes automatic collection pipeline transportation and comprehensive utilization contemplated to reach a easily dropping, automatically collecting, discharging, transporting of all kinds of the solid wastes, getting the plastic package free renewable waste for recycle. The disclosed method and apparatus comprise going toward and near the multiple waste fluidizing collectors set indoor and outdoor, automatically opening the lid of the collector, putting the wastes into the specified containers according to the requirement of the waste recycle program, respectively fluidizing all kinds of the solid wastes into flowable particle and jam to satisfy the pipeline transportation, the multiple waste fluidizing collector in the invention is designed to receive, deposit the wastes and change the solid waste from solid into liquid, that leads to the solid waste automatic collection, transportation and getting the plastic package free, renewable uniform waste for recycle. It is expected to replace currently manual waste collection, waste disposal and management.

8 Claims, 4 Drawing Sheets

METHOD AND APPARATUS OF SOLID WASTES AUTOMATIC COLLECTION DUCTWORK EVACUATION AND COMPREHENSIVE UTILIZATION

This application claims the benefit under 35 USC 119 to application 200910106173.0 filed in China on Mar. 26, 2009 and to application 200920136197.6 filed in China on Mar. 26, 2009.

BACKGROUND

1. Field of the Invention

The present invention, the method and apparatus for the solid wastes automatic collection pipeline transportation and comprehensive utilization, pertains, in general, to the solid waste automatic management, to all kinds of the solid wastes easily dropping, automatically collecting, discharging, transporting, getting the renewable uniform wastes for recycling, putrescent waste contamination eliminating, plastic materials pollution eliminating, greenhouse gas reducing and the waste automation.

2. Background Art

The method and apparatus for the solid wastes automatic collection pipeline transportation and comprehensive utilization is designed to reach all kinds of the solid waste automatically collection, discharge and transportation, get renewable uniform waste for recycling, eliminate solid waste pollution, and generate benefit from the waste utilization.

Waste disposal is a huge challenge for the dwellers, municipalities, industries, and businesses. It is expensive and time consuming to collect millions of tonnes of trash every year, and there are risks to the environment no matter how we dispose of it. The ideal situation is to create no waste, but that is difficult to do. The invention hereby is to build an effective, quiet and safer method and apparatus to deal with such problem, to achieve all kinds of the solid wastes automatically collecting, discharging, transporting and getting at all of the wastes renewable, that gets benefit from it.

In general, the wastes can be divided biodegradable waste and in-degradable waste. Biodegradable waste is putrescent. It contaminates our environment and living space. It produces odor, infects diseases and generates methane, one of the important greenhouse gas.

Popularly current process of the solid wastes in the world are that putting all of the solid wastes into specified containers, packaging by the plastic bags, cleaning manually and putting it into specified collectors, door to door collecting, and vehicle transporting to the specified disposal site. It is time consuming, waste energy, resource, and inconvenience. It generates secondary pollution, which comes from the plastic package.

Most of the household and units' wastes are good resource for recycle Because it is putrefactive, contaminating of living space, and infecting disease, most of the biodegradable solid wastes are put into the plastic bag to prevent the odor, leachate and contamination. In some degree, it is easy to collection and transportation, but it causes much contaminated plastic materials going into the nature, that causes serious pollution. Because of plastic materials are stable in the nature and could not be decayed by bacteria, it accumulates in the world that aggravates the pollution of the municipal waste. Using plastic to package the biodegradable waste causes both plastic and biodegradable waste cross-contamination, and complicates the component of the municipal wastes. It is difficult to sort and difficult to recycle that causes wasting the resource and serious environmental pollution.

Disposal such waste is a big challenge. The present disposals of such municipal waste are landfill, incineration and compost. Landfill and incineration are pollution transfer, they are not complete eliminate such waste in the world. For example, landfill is only the process of transporting municipal waste from cities to landfill site. Landfill generates greenhouse gas, odor and leachate, which related the atmosphere warm, air pollution, contaminate groundwater, surface water and cost much land. Incinerators are sometimes used to burn waste under carefully controlled conditions. They are an acceptable form of disposal, but they are not a perfect solution either. The ashes must be disposed of either at a landfill, or if they are toxic, at a hazardous waste facility. Burning garbage also produces acid gases, carbon dioxide and toxic chemicals that must be treated with expensive air pollution control equipment to avoid contributing to acid rain, ozone depletion and air pollution. Such waste is difficulty to compost. Besides, compost can cause odor and accumulate large contaminated plastic come from the package of municipal waste too.

Currently, there is less research, patent and essay can give an effective solution for the solid waste automatic collecting, transportation, disposal and completely elimination of the solid waste. There are patents and research arts, but most of them limited in the waste sorting, shredding and transferring. For example, the patents about food and closet waste disposals, which limited for food scraps and closet waste jam of drainages, are the pollution transfer too. All biodegradable solid wastes have different size, rigidity and component. Food waste and closet waste disposers which set under dishpan, galley sink as well as spittoons are limited on shredding of small food scraps and closet wastes, they are difficulty to cut and grind the large size and hard solid waste, for all of the food scraps flush into public drainage system that causes the increase of waste water, consuming large of fresh water and wasting resource. It transfers solid waste into wastewater and exacerbates the pollution for that is difficult purifying. The disposer is also easily mechanism jam caused by hard food waste, such as beef bones.

On-site treatment method of food waste, U.S. Pat. No. 7,108,788, need large extra space, such as the wastewater collector, the waste separate chamber. It is difficulty to implement in household and business units. The wastewater of the process is still drainage into municipal wastewater systems that causes much difficulty to purify and exacerbates the pollution.

Aiming to reach the facilitated dropping, automatically dumping, collecting, and transporting of all kinds of the solid wastes, get the renewable uniform wastes and achieve the waste management automation, to overcome such problems encountered in the prior arts, the invention hereby designed an effective method and safe apparatus, to greenhouse gas reduction, plastic pollution elimination, putrescent solid wastes automatically removing, and recycling. It is to make all of the wastes renewable and replace the currently manual waste collection, waste disposal and waste management to reduce the liability of the dwellers, industrials and municipalities.

SUMMARY

Figure 1:
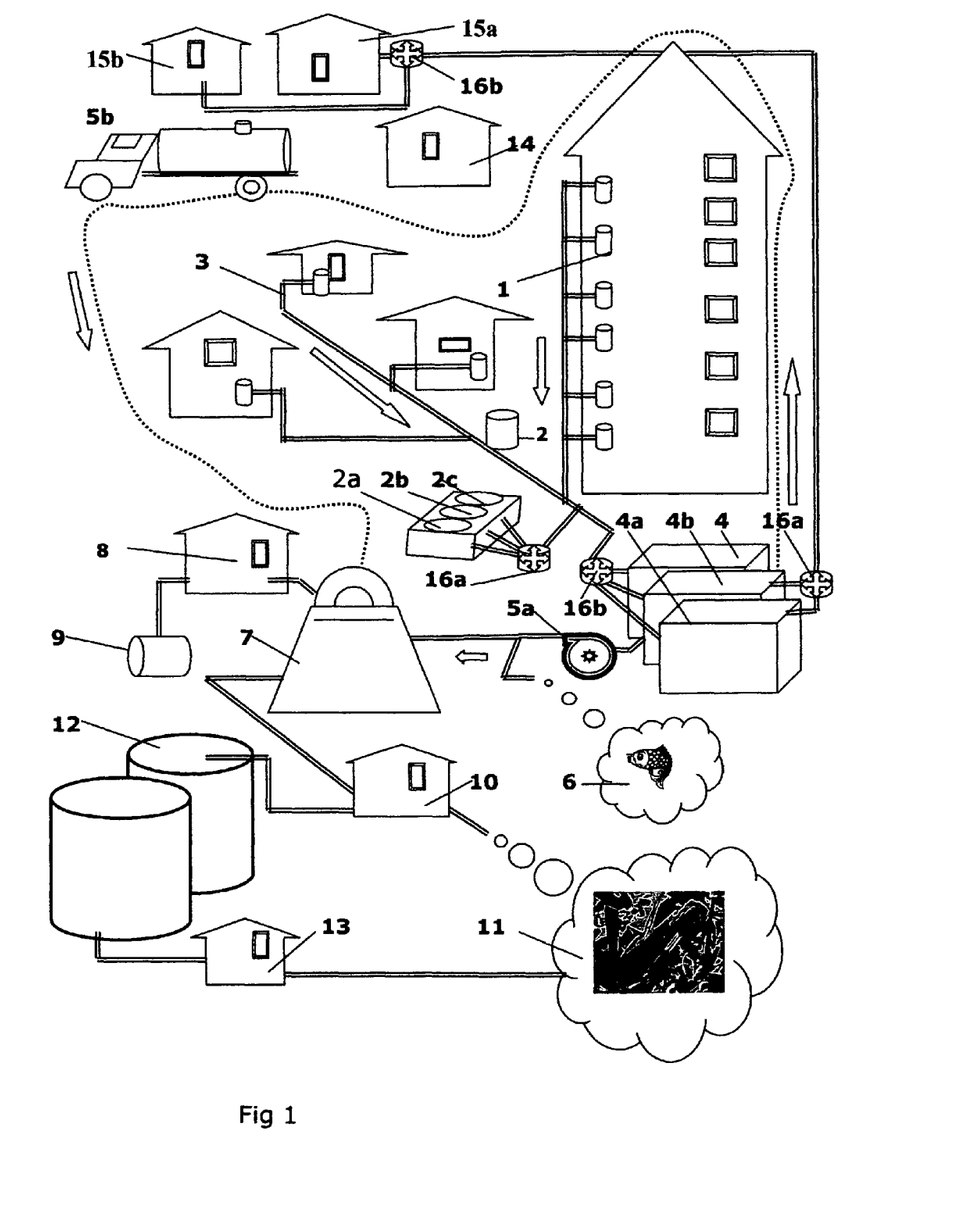
FIG. 1 is a diagram showing the procedure of the method for the waste according to the present invention.
Figure 2:
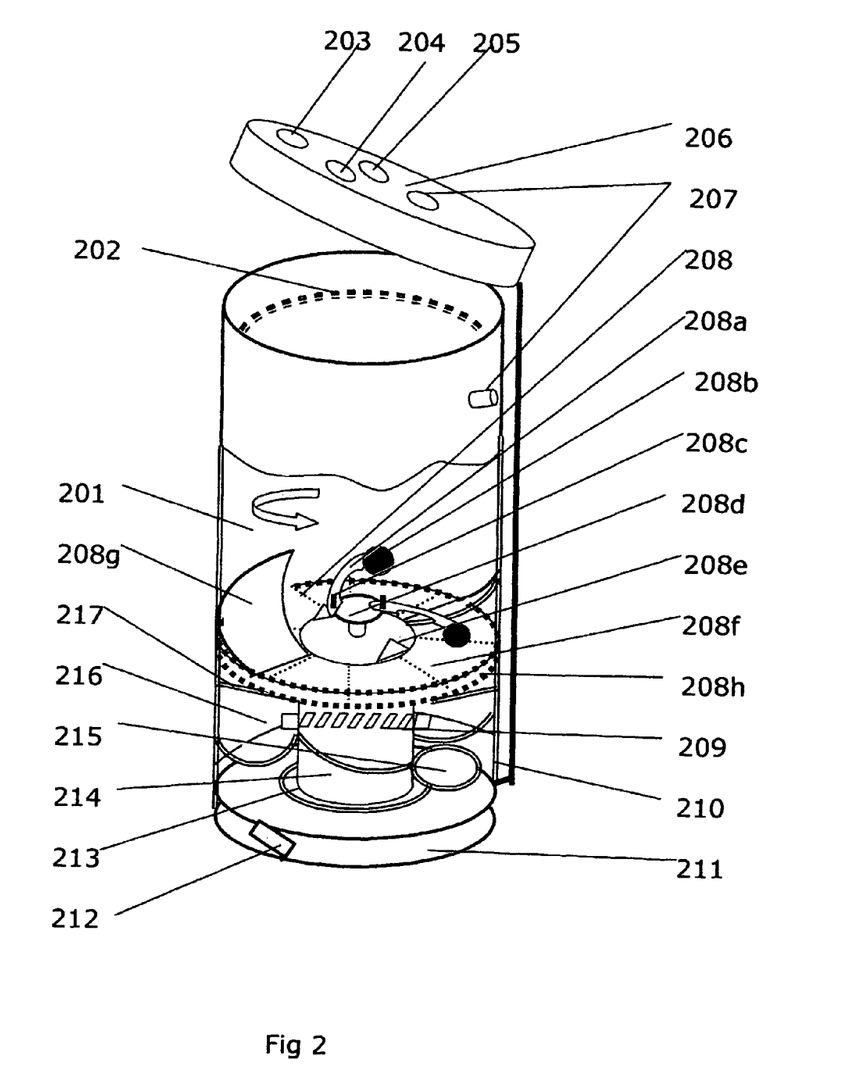
FIG. 2 is section view of the multiple waste fluidizing collector according to the present invention.
Figure 4:
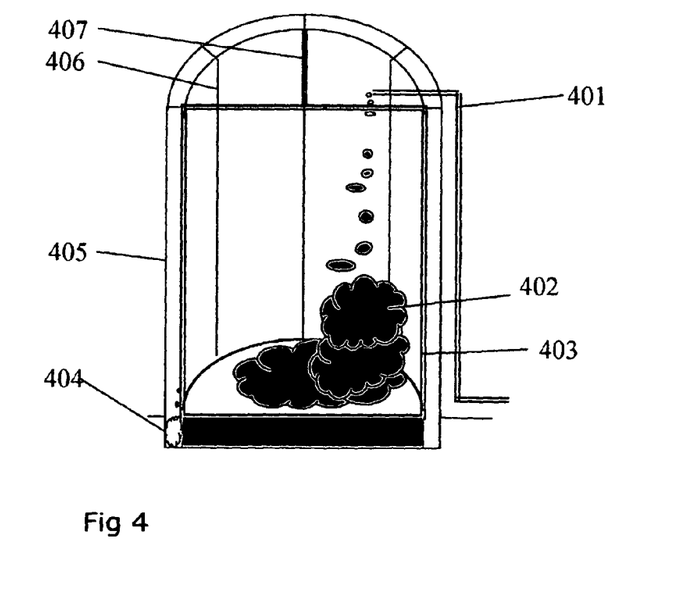
FIG. 4 is the section view of the gravity compress filter dewater chamber.

The present invention, the method and apparatus for the solid wastes automatic collection pipeline transportation and comprehensive utilization, contemplates a feasible process to change the waste from solid phase into liquid phase to satisfy the pipeline transportation, achieve solid waste automatic collection and get the plastic package free renewable uniform waste for recycle. By the means of fluidizing the solid wastes with both gaseous medium and liquid medium into flow-able particles or liquid phase to satisfy the pipeline transportation, the invention designed a method of:

going toward and near the multiple waste fluidizing collectors set indoor (1) and outdoor (2), the lid (206) is automatically opened by the lid automatic open infrared sensor assembly (203) set in the multiple waste fluidizing collector;

separately putting the solid waste (a), waste (b), and waste (c) according to the requirement and the label of the waste recycle program, such as plastic waste, paper waste and biodegradable waste into the correspond container (2a), (2b) and (2c) of the multiple waste fluidizing collectors (1) and (2);

controlling by the management house (14) through sending the information to the main board (204), by which turning on the power of the multiple waste fluidizing collector at a set time, automatically proportioning the mediums with both liquid and gas according to the moisture of the wastes collected in the containers and specified use of the recycle program, adding 0.00% to a set proportion of water into the containers;

respectively fluidizing the wastes in the containers into both fluidized dry particle and wet jam to satisfy the duct pipeline transportation;

driving by the liquid pumps and gaseous suction, controlling by the management house (14) and the main board (204), alternatively opening each of the automatic outlet valves (215) and (16a), and alternatively turning the outlet valve (16b) to the correspond regional collect tank (4a), (4b) and (4), respectively discharging the fluidized waste (a), (b) and (c) going through the pipes (3) which connect all of the automatic outlet valves (215), (16a) and (16b) into the regional collect tank (4a), (4b) and (4) that gets the renewable uniform wastes without the plastic package;

transporting by the vehicle (5b) and ducting pipeline with pumps (5a), the plastic waste (a), the paper waste (b) and the food waste fluidized particle and jam going into the recycle plants (15a), (15b) and bio-purification chamber (6) for recycle, other fluidized particle and jam going to the methane generating pools (7) for methane, the dreg going to the dewater chamber and dewatered by the gravity compress filter and dewater chambers (12) for organic fertilizer;

controlling by the manage house (14) through the remote controlling system, alternatively turning the outlet valve (16b) set at the end of the municipal drainage and public pipeline toward to the drainage and the regional collect tanks, conducting the fluidized wastes going through the public pipeline and the drainage to the regional collect tanks, that can reach at to manage the capacity of the facility and make the most to share the living regional municipal drainage, public pipeline and facilities.

the gravity compress filter dewater chambers comprises the cylinder (402) which formed by the joint (406) and the holding frame (407) to hold the dreg which forced by gravity, the wastewater pass through the filter wall (403), going into the wastewater collector (404), the odor prevented by the de-odor chamber (405). It can be used for both methane generating pool and the dreg dewater chamber.

Figure 5:
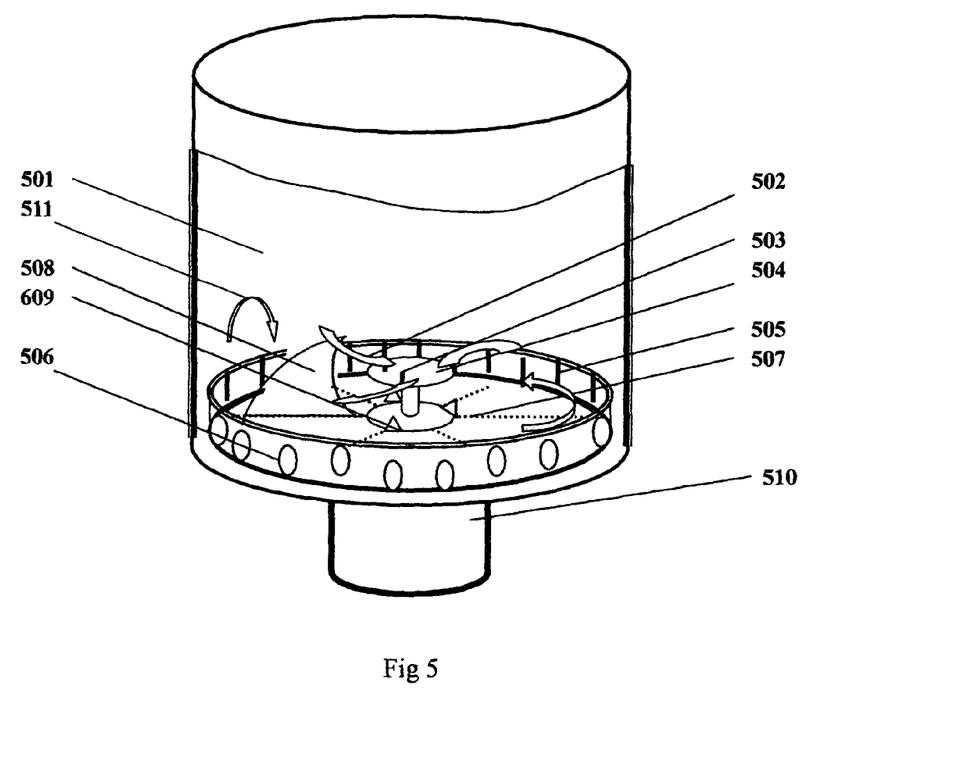
FIG. 5 is the section view of multiple mechanism jam free fluidizing assembly with side screen and cut and the medium circulation.

One of the important apparatus of the invention is the multiple waste fluidizing collector, it has the high function of water saving, timing, automatic waste collecting, and waste fluidizing, it comprises:

the lid (206) opening by the automatic lid opener infrared sensor assembly (203), the food step opener (212) and automatically cutting of the power switch of the motor for safety;

the waste container (201), (2a), (2b) and (2c) are set to receive, hold and deposit the wastes according to the requirement and label of the waste recycle program;

controlling by the management house (14) and the main-board (204), through the remote control system and information exchange assembly (204) and the timer (205), turning on the power at a set time;

proportioning the medium and adding a set amount of water into the containers by the automatic water proportion assembly (207), and the weight sensor (211);

driving by the motor (214), fluidizing the wastes in the containers into flowable particle and jam to satisfy the pipeline transportation by the multiple mechanism jam free fluidizing assembly (208), which comprises the assembled multiple function and high effective parts to cut, shred, hammer and grind the different waste into flowable particle and prevent the mechanic jam, the plural flexible arc infeeding blades (208a), the hammer balls (208b), are linked by the rotatable shafts (208c), which are equiangular fixed on the disk (208d), the plural equiangular fixed, rotating vertical blades (208e), the indention edge, serration face grinding disk (208f), the plural equiangular fixed, flexible baffles and cuts (208g) and the low indent cut screen (208h) form a flexible fluidizing assemble (208) to fluidize the waste and anti mechanic jam;

by the controlling of the low indent cut and screen (208h), the size of the hole on the fixed screen and cut ring (506), it gets the uniform waste particle with designed granularity;

transporting by the pump, vacuum aspirator, and suction chamber (209), under the controlling of the automatic outlet valve (215) and (16a), through the auger-type depot (216), the fluidized wastes are alternatively discharged into the correspond regional collect tanks (4a), (4b) and (4) that gets the plastic package free wastes;

automatically cleaning the containers to reduce the odor for next use by the automatic cleaning and de-odor assembly (202);

adjusting the work condition by the heater (217), reducing the noise and vibration by the deadening (210) and the shock absorber (213).

In general, when someone going toward and near the multiple waste fluidizing collector set indoor and outdoor, the lid opening automatically and cutting off the power of the motor for safety, separately putting the waste (a), waste (b) and waste (c) according to the requirement and the label of the waste recycle program into the specified containers (2a), (2b) and (2c), the lid closing automatically and the wastes is deposited in the containers, controlling by the management house (14) through sending the information to the main board (204) set in the collector, at a set time, turning on the power of the collector, proportioning the medium by the weight sensor (211) and the water proportion assembly (207), adding the water into the containers to a designed proportion, driving by the motor (214), fluidizing the wastes in the containers by the fluidizing assembly (208) into the fluidized uniform particle and jam with a designed granularity controlled by the indent cut screen (208h) and the size of the hole of the fixed screen and cut ring (506), by the controlling and alternatively opening the automatic outlet valve (215), (16a) and (16b), driving by the suction chamber (209), alternatively discharging the fluidized wastes (a), (b) and (c) from the containers going through the pipeline (3) which connected with the outlet valve (215), (16a) and (16b), to the correspond regional collect tanks (4a), (4b) and (4), that getting the uniform wastes without the plastic package, cleaning the containers by the deodor assembly (202) to prevent the odor for next use, the plastic waste and paper waste are transported to the recycle plant (15a) and (15b) for recycle, the biodegradable waste transported to the methane pool for methane, the dreg dewatered for organic fertilizer, the dreg can directly transport to back yard for underground irrigation to reduce the odor, the multiple waste fluidizing collector founds the basic of the solid waste automation, it is used to fluidize different size and rigidity solid wastes into both dry uniform particle and wet jam that made all of the solid wastes can go through the pipes. In order to meet different work condition, the process procedure and the parts of the invention method and apparatus can be simplified for specified use.

The invention will be expected to replace the currently manual waste collection, transportation and waste management, because all of the wastes collected by the invention method are renewable, there will be no waste for the landfill and incineration, which will largely reduce the greenhouse gas emission.

DETAIL DESCRIPTION OF THE PRESENT INVENTION

With reference to accompanying drawings, the present invention, the method and apparatus for the solid wastes automatic collection pipeline transportation and comprehensive utilization is described by the steps and apparatus of easy dropping and automatically collecting, mediums proportioning, fluidizing, discharging, getting the waste without plastic package, transporting and utilizing the waste.

Easy Dropping and Automatically Collecting

Setting the multiple waste fluidizing collector indoor (1), such as kitchens, industrial units and malls and outdoor (2), such as squares, curbsides and parks is to facilitate the owners and pedestrian to drop the wastes. When someone goes toward and nearby the multiple waste fluidizing collector, the infrared sensor and lid opener controlled by the main board automatically opens the lid of the multiple waste fluidizing collector and cuts off the power of the motor for safety, separately putting the waste (a), waste (b) and waste (c) according to the requirement of the municipal solid waste recycle program, such as the plastic waste, paper waste and biodegradable waste into the specified container (2a), container (2b) and container (2c) set in the multiple waste fluidizing collector, after dropping, the lid automatically closes and connects the power of the motor, the wastes are deposited in the containers.

Proportioning the Mediums

Controlling by the management house (14) through sending the information to the main board (204), by which turning on the power of the collector at a set time, the automatic water proportion assembly (207) set in the multiple solid waste fluidizing collector automatically proportions the medium and adding a set amount of water into the containers to reduce the water consuming, waste waster generating and getting the high quality of the renewable waste. In general, most of the solid waste contains 50% to 80% water. If the waste particles contain more than 80% water, the particle will be floatable. For the water saving and reducing the wastewater of the procedure, the present invention equipped with water proportion assembly (207), which controls the water consuming by the weight sensor (211) and main-board (204). The present invention designed two ways to meet the requirement of different user, one is wet fluidizing, restrictively adding a set amount of water or liquid medium into the waste container by the water proportion assembly which controlled by programmed main board (204) according the weight of the waste in the container, the second is dry fluidizing, that adds no liquid into the containers to get the dry fluidized particle and save the water.

Fluidizing the Waste into Flowable Particle

Automatically fluidizing all kinds of the solid wastes with both gaseous medium and proportioned liquid into uniform dry waste particle and wet jam, making all kinds of the solid wastes from solid to fluid particle or liquid is to satisfy the pipeline and pumps transportation, such as liquid pump, gaseous pump, vacuum aspirator and suction. The components of solid waste are complex, it comprises different kind of coming sources such as yard trash, food waste, farm, industrial waste and business trash, different elements, such as plastic, fiber, lawn, leaves, food, wood, bones and shell, different size, such as pumpkin, potato and cabbage, different rigidity, such as wood, meat, pork bon, beef bon, shell and nucleolus. They are difficulty to fluidize and easy cause mechanism jam. To overcome such problems, the present invention developed a multiple mechanism jam free fluidizing assembly (208) set in the multiple waste fluidizing collector. The granularity of the fluidized waste controlled by the size of the hole on the fixed screen and cut ring (506) and the low indent cut screen (208h).

Discharging the Fluidized Waste and Getting the Waste without Plastic Package

Driving by the pump and suction (209), discharging the fluidized wastes going through the pipeline (3) to the regional collect tanks (4), that getting the uniform wastes without plastic package. The present invention is designed to share the present municipal drainage and the public pipeline to reduce the cost of the pipeline construction by managing of the waste discharging time, setting the automatic outlet valve (16a) in the invention waste fluidizing collector, and the automatic outlet valve (16b) at the outlet of the present municipal drainage or the end of the public pipeline, during the spare time of the pipeline, by controlling and monitoring of the regional manage house (14) and the main board (204), driving by the pump and suction chamber (209), alternatively discharging the fluidized waste (a), (b) and (c) going through the municipal drainage pipeline, in the same time alternatively turning the automatic outlet valve (16b) toward the regional collect tanks (4a), (4b) and (4), conducting the fluidized wastes going to the regional collect tank (4a), (4b) and (4), after cleaning the drainage pipeline and then turning the automatic outlet valve (16a) back to municipal wastewater system, that getting the renewable uniform wastes without plastic package. In the same time, through the same one pipeline could get to collect different kind solid wastes according to the requirement and the label of the municipal waste recycle program, such as plastic waste, paper waste and food waste, and getting renewable uniform wastes without cross-contamination. Setting a discharge time schedule, such as 9:00 pm for the plastic waste, 10:00 pm for paper waster and 11;00 pm for food waste, according to the scheduled time, alternatively opening the outlet valve (16*a*) and turning to the outlet valve (16*b*) toward the regional plastic waste collect tank (4*a*) from 9:00 pm to 10:00 pm, toward the paper waste tank (4*b*) from 10:00 to 11:00 pm and toward the food waste tank (4) after 11:00 pm, discharging each of the fluidized waste particles and jam going to the correspond waste tanks (4*a*), (4*b*) and (4) on the scheduled time through the same pipeline and that could get the separated renewable uniform wastes by sharing the same one pipeline.

Transportation

Plastic waste, paper waste and useful nutrient food waste particle and jam are transported to recycle plants (15*a*) and (15*b*) for recycle and bio-purification. Another waste, such as grasses, leaves and industrial waste particles and jam transported to methane pool as well as alcohol generate pools to produce methane or alcohol.

Setting the regional collect tanks in residential site is easy for collecting, managing the capacity of the process system, sorting and transportation. If the collect tank is far from the disposal site, the waste particle and jam can be transport by both vehicle (5*b*) and ducting pipe with pumps (5*a*).

The lower the viscosity of the particle and jam is the better for the transportation and the lower cost. However, if the more the water added, the more the wastewater generated, the more water consuming and the lower that can cause devalue of the waste particle and jam which causes waste resource. Water proportion assembly equipped in the invention multiple waste fluidizing collector is to balance the problems and offer the best solution. Besides, the present invention designed two transportation ways, it comprises:

A. Gaseous medium fluidizing, by vacuum pump, air pump and high density and viscosity pump evacuation through the pipe transportation, the dry fluidized waste particle or high density and viscosity waste jam transported by duct pipeline and pumps with gaseous medium. For the water short district, it is the advantage of water saving and low wastewater, but the cost is higher, because it needs more power to transport the particle and jam in the duct pipeline and the diameter of duct pipe is larger, that means the higher cost of the pipeline construction.

B. Proportion water or liquid medium grinding, liquid medium pumps and pipeline transportation, the wet waste jam transported by the pumps and duct pipeline with liquid medium. It is advantage of low cost of the pipeline construction and easy discharging and transporting. A test showing the fluidized waste particle and jam can go through the 2 cm diameter pipeline without jam. However, it could cause a little bit more wastewater.

Both of the dry and wet fluidizing has the advantage of odorless, sanitary, no contaminated plastic package pollution, and getting renewable uniform waste particle and jam. The wastewater caused is under controlling. Besides, both A and B can be cross-referenced and employed for specified use.

Recycle and Utilization;

Sorting the fluidized particle and jam by the coming source, transporting the plastic waste, paper waste and useful nutrient food waste, such as food industrial waste, restaurant, household kitchen waste to recycle plants for recycle and bio-purification such as breeding worm, snail and aquatics. Other fluidized particle and jam is transported to methane generating pool for methane. It is highly use the fluidized particle and jam as a source of energy which eliminates the greenhouse gas. After sterilizing, the dreg is transported to farm for irrigation. If it is an independent house, industrial and business unit, the dreg could be directly transported to backyard and garden for irrigation. For the odor reducing and absorbing, the invention developed an underground irrigation and hydrophyte purification system by ground aqueduct, conducting the dreg going under the root of lawn and hydrophytes can effectively eliminate the odor. The dreg can also be pumped to dewater chamber for organic fertilizer and further carbonization for fuel. The invention designed a gravity compress dewater chamber (12) to meet the large quantity of the waste dreg dewater process. The gravity compress dewater chamber like a huge cylinder comprises internal fabric filter wall, frames and exterior de-odor wall. It is formed by plural removable filter arcs, which linked together by the joint (406). The dreg is pumped into the cylinder, forced by gravity, the wastewater going through the filter wall (403) into the wastewater collector (404), after drying, remove the filter arcs and take out the dewatered dreg for fertilizer. The dreg also could be carbonized for fuel by the high temperature. The gravity compress dewater chamber could be used for methane ferment pool, the methane can be collected in the de-odor wall (405), after fermenting, the dreg could be dewatered by the gravity which forces the wastewater going through the filter wall and get the dewatered dreg for fertilizer. Using gravity compress dewater could be largely reducing operation cost of the process system.

The Apparatus

The important apparatus in the invention is the multiple waste fluidizing collector. The working principle of the invention multiple waste fluidizing is collector is, opening the lid by infrared sensor lid opener assembly (203), putting all of the different size and hard solid waste (a), (b) and (c) into the correspond container (2*a*), (2*b*) and (2*c*) of the invention multiple waste fluidizing collector, proportioning the medium by the weight sensor (211), the water proportion assembly (207) and the main board (204), driving by the motor (214), cutting, hammering and shredding the solid waste into scraps by the vertical blades (208*e*), the flexible arc infeeding blades (208*a*), the hammer balls (208*b*), automatically solving the mechanic jam caused by the large sizes solid waste by that when the wastes blocking the flexible arc infeeding blades (208*a*) and the hammer balls (208*b*), they turn back to center by the rotatable shaft (208*c*) and form a ellipse or indent disk with cutting edge and hammer and largely reduce the resistance, by the cutting and hammering of the formed ellipse or indent disk, it automatically breaks down the mechanism jam easily. The scraps cut by the vertical blades (208*e*), and forced by centrifugal of spinning going into the gap between the indention edge, serration face grinding disk (208*f*), on which equipped alloy tooth on the surface, and the flexible baffles and cuts (208*g*), which plural equiangular fixed on the wall of the container, the baffle force the scraps down and block onto the serration face grinding disk which grinds the scraps into floatable, fluid particle and jam. If the resistance is higher than the normal work condition, it may cause mechanism jam which can be released by the elasticity of the edge of the flexible baffle, the flexible baffle edge will be forced to go up and down by the elasticity, that can easily release the waste scraps blocked between the baffle and the serration face grinding disk and solve the mechanic jam in second. After cutting, the fibers are forced to the edge between the indention edge, serration face grinding disk and the low indent cut screen, which cut, filter and screen to get the uniform granularity and fluid particle and jam. Driving by the pump, aspirator, suction chamber (209), discharging, transporting the fluidized particle and jam from the container going through the anger-type bottom depot (216) and the pipe (3) into the regional collect tanks. That gets the renewable uniform waste particle and jam without any contaminated plastic package.

To improve the medium circulation, the low indent cut screen and indention edge of the serration face grinding disk can stand up, to form a rotating cut ring and fixed screen and cut ring. By setting the diameter of the hole of the cut screens above, we can get the designed granularity of the fluidized waste.

The invention multiple waste fluidizing collector equipped heater for that can work well in low temperature and bad weather condition, such as outdoor and winter, besides it can be used to intenerate the plastic to improve the solid waste fluidizing.

To benefit and safe the user, the invention multiple waste fluidizing collector quipped automatic clean, de-odor, noise reducing, safe operating power switch, and lid opener infra-red sensor assembly.

To easy discharge, the invention multiple waste fluidizing collector equipped the auger-type depot bottom.

To be manageable, the invention multiple waste fluidizing collector equipped timer, main board and remote control system.

For the regional system management and regional remote controlling, the invention multiple waste fluidizing collector equipped information exchange assembly.

The process procedure and the parts of the invention method and apparatus can be simplified for specified use. For example, for the independent house and independent units, the fluidized particle and jam can be directly transported to the collect chamber of the methane generating pool, methane product purified and used as fuel for the heart of the unit, the dreg is transported to back yard and garden for irrigation, that forms an independent recycle system. If it is for the large size and soft solid waste grinding, some parts of the multiple waste fluidizing collector can be taken off, such as the hammer balls of the multiple mechanism jam free fluidizing assembly that can simplify the machine to reduce power consuming. The multiple waste fluidizing collector can be combined for multiple and specified use.

Illustration with Drawing and Example

FIG. 1, the diagram of the procedure of the disposal method for the waste according to the present invention, it comprises the invention multiple waste fluidizing collector (1) set indoor, such as the houses, building and industrial units, the invention multiple waste fluidizing collector (2) set outdoor, such as curbsides, parks and public squares. Respectively putting the solid wastes (a), (b), (c) according to the requirement or the label of the municipal waste recycle programs, such as the plastic waste, paper waste and other biodegradable waste, into the correspond waste container (2a), (2b) and (2c) of the invention multiple waste fluidizing collector, fluidizing the wastes in the container with the proportioned mediums, controlling by the management house (14), alternatively opening the automatic outlet valves of the container (2a), (2b) and (2c) or the outlet valve (16a), and turning the outlet valve (16b), which set at the end of the pipe (3) toward the regional collect tanks (4a), (4b) and (4), respectively discharging the plastic waste (a), paper waste (b) and other biodegradable waste (c) going through the same pipeline (3) into the regional collect tanks (4a), (4b) and (4), that getting the renewable uniform wastes. Transporting by the vehicles (5b), the pipe with pumps and vacuum aspirators (5a), the plastic waste (a), paper waste (b) and useful food waste particles and jam respectively going to the plastic waste recycle plant (15a), the paper waste recycle plant (15b) and the feedstuff plants (6) for recycle and bio-purification. The other biodegradable waste particle and jam (c) is going to the methane pool (7), methane purified by the purification chamber (8) for the fuel (9). One dreg after the disinfecting and sterilizing chamber (10) is transported to the farm (11) for irrigation, another dreg to the dewater chamber (12) and dewatered by the gravity compress filter dewater chambers (12) for organic fertilizer, waste water purified by the filter and activated carbon screen chamber (13) for recycle, controlling by the regional manage house (14) through the remote controlling system to share the spare time of the regional municipal drainage, public pipeline and facilities and to manage the process capacity.

FIG. 2, the section view of the multiple waste fluidizing collector according to the present invention, in the diagram, the multiple waste fluidizing collector comprises the waste container (201), the automatic cleaning and de-odor assembly(202), the safe power switch and automatic lid opener infrared sensor assembly (203), the main-board, remote control system and information exchange assembly (204), the timer (205), the lid (206), the automatic water proportion assembly (207), the multiple mechanism jam free fluidizing assembly (208), which comprises the plural flexible arc infeeding blades (208a), the hammer balls (208b), the rotatable shafts or swivel conjoint (208c), which are plural equiangular fixed on the disk (208d), the plural equiangular fixed, rotating vertical blades (208e), the indention edge, serration face grinding disk (208f), the plural equiangular fixed, flexible baffles and cuts (208g), the low indention cut screen (208h), the pump, vacuum aspirator, suction chamber (209), the deadening (210), the weight sensor (211), the food step opener (212), the shock absorber (213), the motor (214), the automatic outlet valve (215), the auger-type depot (216), the heater (217).

Figure 3:
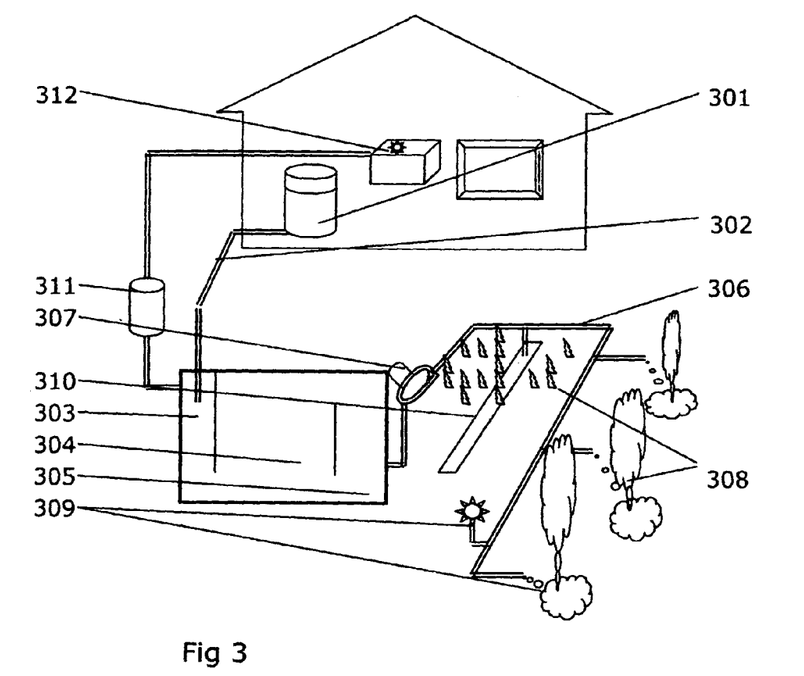
FIG. 3 is a diagram showing the procedure of the waste disposal method for independent house and commercial, industrial unit according to the present invention.

FIG. 3, a diagram showing the procedure of the waste disposal method for independent house and commercial, industrial unit according to the present invention, putting all of the wastes into the invention multiple waste fluidizing collector (301) set indoor and outdoor, fluidizing the waste into fluidized uniform particle and jam, discharging the fluidized particle and jam going through the connected pipe (302) into the collect chamber (303), then going to the methane generating chamber (304), and finally going to the dreg chamber (305), through the duct pipe (306), and the pump (307), transporting the dreg into the garden and back yard (308) for both surface irrigation by the sprayer (309) and underground irrigation (310) to eliminate the odor, the methane purified by the purification chamber (311) and transported to the heater (312) for fuel.

FIG. 4, the section view of the gravity compress filter dewater chamber according to the present invention. The dreg is pumped going through the duct pipe (401) into the dewater cylinder (402), by the compressing of the gravity, the wastewater going through the filter wall (403) into the wastewater collector (404) and then going into wastewater purification chamber, the odor is confined in the de-odor chamber (405), the filter arcs which are linked by the joint (406) and the holding frames (407) form the cylinder.

FIG. 5, the diagram showing the section view of the multiple mechanism jam free fluidizing assembly (208) and the medium circulation in the container. In the diagram, (501) is the waste container, (502) is the plural flexible arc infeeding blades, (503) is the rotatable shafts or swivel conjoint, which are plural equiangular fixed on disk (504), (505) is the rotating cut ring, (506) is the fixed screen and cut ring, the diameter of the hole controls the granularity of the waste particle and jam, (507) is the serration face grinding disk, (508) is the plural equiangular fixed, flexible baffles and cuts, (509) is the plural equiangular fixed, rotating vertical blades, (510) is the motor, (511) is the medium circulation. Driving and fluidizing by the multiple mechanism jam free fluidizing assembly, the medium in the container forms a circulation and forces the fluidized waste in the container passing through the screen repetitiously to get at a designed granularity.

Example 1

Putting 20 kg miscellaneous garbage of coconut, grass, bon, and food waste into the container (201) of the invention multiple waste fluidizing collector, turning on the power switch, setting timer, proportioning by the multiple waste fluidizing collector and automatically adding 20 L water into the container (201), each 30 seconds intermittently turning on the power of the motor according to the setting program, driving by the motor, cutting, hammering, shredding, and comminuting the waste in the container for 5 minutes by the multiple mechanism jam free fluidizing assembly (208), controlling by the main-board and turning on the clutch of the pump and vacuum aspirator in the chamber (209) and the outlet valve (215), driving by motor (214), evacuating by the pump and vacuum aspirator, discharging the fluidized waste jam from the container going through the pipe (3) with 2 cm diameter into collect tank (4), by the cutting and screening of the low indent cut & screen (208h), getting 40 kg uniform fluidized waste jam. 100% of the waste in the container is fluidized and no more waste left in the container. By the programming, turning on the automatic cleaning and de-odor assembly (202), spraying 0.5 L-1 L of water, washing and cleaning the container, automatically eliminating the odor in the container by the ozone generator and carbon absorber. It runs very quietly and smoothly without mechanism jam in the process. The uniform fluidized jam is transported to methane generate pool (7). After 70 days, 6.8 cube meters of methane collected. After sterilizing, the dreg is transported to garden for under ground irrigation without odor.

Example 2

The green house module, the household solid waste collected, and fluidized by the multiple waste fluidizing collector into uniform waste jam with wastewater and discharging it into methane generate pool through 2 cm diameter pipeline, the methane is collected and purified for fuel to heat water for the house, the dreg and wastewater is transported to irrigate the lawn, flower and garden plant, the harvest grass, vegetable and garden trash with household waste are fluidized by multiple waste fluidizing collector into waste jam and discharged into methane generate pool for methane, that forms a green circular.

Example 3

The Industrial Application

Most of the municipal wastes coming from residence, industrials and commercial units comprise household waste, plastic waste and paper waste. Setting the combined multiple waste fluidizing collectors in the kitchens, industrials and public squares. When someone is going near the multiple waste fluidizing collectors, the infrared sensor assembly (203) is automatically cutting off the power switch and opening the lids of the multiple waste fluidizing collectors, separately putting the biodegradable waste, plastic waste and paper waste into the specified containers (2c), (2a) and (2b) of the combined multiple waste fluidizing collectors, after accumulating to a set capacity or the set time, the water proportion assembly (207) is turned on and proportioning the water, respectively adding 50% water into the container (2c), 0% water into container (2a) and (2b), driving by the motor (214), the fluidizing assembly (208) of the multiple waste fluidizing collectors respectively fluidizes the biodegradable waste in the container (2c) into uniform wet jam, the plastic waste in the container (2a) and the paper waste in (2b) into the designed dry waste particle to satisfy the 2.5 cm diameter pipeline transportation, through the automatic outlet valve (215) set under each of the containers, and the pipeline (3) built up with the 2.5 cm diameter pipes which connected all of the automatic outlet valves, setting the automatic outlet valve (16b) at the end of the pipeline, or in front of the regional collect tanks (4), (4a), and (4b), by the controlling of the management house (14) through the main-board (204), the remote control system and information exchange assembly set in the multiple waste fluidizing collectors, the fluidized waste particles and jam are discharged accordingly:

- at 9:00 pm, opening the outlet valve of the container (2c), the biodegradable waste container, and turning the outlet valve (16b) to the regional biodegradable waste collect tank (4), all of the fluidized biodegradable waste jam is evacuated by the suction (209) going through the pipeline (3) into the regional biodegradable waste collect tank (4) and getting the renewable uniform biodegradable waste;
- at 10:00 pm, after cleaning the pipeline by spraying water, opening the outlet valve of the container (2a), the plastic waste container, and turning the outlet valve (16b) to the regional plastic waste collect tank (4a), all of the fluidized plastic waste particle is evacuated by the suction going through the pipeline (3) into the regional plastic waste collect tank (4a) and getting the renewable uniform plastic waste;
- at 11:00 pm, opening the outlet valve of the container (2b), the paper waste to container, and turning the outlet valve (16b) to the regional paper waste collect tank (4b), the fluidized paper waste particle in the container (2b) is evacuated by the suction going through the pipeline (3) into the regional paper waste collect tank (4b) and getting the renewable uniform paper waste.

Respectively transporting plastic waste particle and paper waste particle to the correspond recycle plants (15a) and (15b) for the valuable, renewable resource.

The biodegradable waste jam is transported through the 2.5 cm diameter pipeline by the pump directly going to the gravity compress filter dewater chamber (12) and ferment for methane. After 70 days ferment, the methane has been collected in the de-odor chamber (405) and transported through the pipe to purification chamber (8) for fuel. The waste water is going through the filter wall (403) into the waste water collector (404), and disinfected for soil less growth liquid. The dreg is dewatered by the gravity for the organic fertilizer.

It reached that all kinds of the wastes are completely recycled and renewed. It will be expected to replace the current manual waste collecting system and waste management for it made the wastes going through the pipeline, without plastic package that gets the renewable uniform fluidized wastes. It has reached at the solid waste automation that reduces the liability of the dwellers, industrials and municipalities.

What is claimed is:
1. A method for the solid wastes automatic collection pipeline transportation and comprehensive utilization generated from all kinks of the solid wastes automatically collecting, discharging, transporting, and getting the renewable uniform wastes without the plastic package for recycle comprises the following steps and apparatus of:
  going toward and near the multiple waste fluidizing collector set indoor (1) and outdoor (2), the lid of the collector is automatically opening;
  separately putting the waste (a), the waste (b) and the waste (c), according to the requirement of the waste recycle program, such as plastic waste, paper waste and biodegradable waste into the specified containers (2a), (2b) and (2c) of the multiple waste fluidizing collectors;
  controlling by the management house (14) and turning on the power of the multiple waste fluidizing collector, automatically proportioning the mediums by the multiple waste fluidizing collector and adding the set amount of water into the containers;
  respectively fluidizing the solid wastes in the containers to satisfy the pipeline (3) and pumps transportation;
  by the controlling of the management house, turning on the correspond outlet valve (16a) and (16b), separately discharging the fluidized waste (a), waste (b) and waste (c) through the pipes (3) going into the correspond regional collect tanks (4a), (4b) and (4) that get the renewable uniform wastes without the plastic package;
  respectively transporting the fluidized renewable uniform wastes, (a) and (b) going to the correspond recycle plants (15a) and (15b), the biodegradable waste to the methane pool for methane, the dreg dewatered by the gravity compress filter dewater chamber for fertilizer.

2. The method of claim 1 wherein the invention apparatus, the multiple waste fluidizing collector comprises:
  the lid (206) automatically opening by the lid automatic open infrared sensor assembly (203) and the foot step opener (212), and the main board (204) automatically cuts off the power of the motor to safe the user;
  the waste containers (2a), (2b), (2c) and (201) are set to receive, hold and deposit the wastes according to the requirement and label of the waste recycle program;
  controlling by the management house (14) and the main board (204), through the remote control system and information exchange assembly (204) and the timer (205), turning on the power at a set time, the medium is proportioned and a set amount of water is added into the containers by the automatic water proportion assembly (207) and the weight sensor (211);
  driving by the motor (214), the wastes in the containers are respectively fluidized by the waste fluidizing assembly (208), transporting by the pump, vacuum aspirator, and suction chamber (209), under the controlling of the automatic outlet valve (215) and (16a), through the auger-type depot (216) the fluidized wastes are alternatively discharged into the correspond regional collect tanks (4a), (4b) and (4) that gets the plastic package free wastes;
  automatically cleaning the containers to reduce the odor for next use by the automatic cleaning and de-odor assembly (202);
  adjusting the work condition by the heater (217), reducing the noise and vibration by the deadening (210) and the shock absorber (213).

3. The method of claim 1 wherein the method of fluidizing, discharging and transporting the solid waste comprises: both A, gaseous medium fluidizing, waterless fluidizing, duct pipeline, pumps, suctions and high density and viscosity pumps with gaseous medium transportation, and B, proportioned liquid medium fluidizing duct pipeline and pumps with liquid medium transportation, A and B can be cross-reference for specified use, the process of the method and the parts of the apparatus can be simplified for specified use.

4. The method of claim 1 wherein respectively discharging the fluidized wastes going into the correspond regional collect tanks achieved by the step: through the pipes (3) which connect all of the automatic outlet valves (215) and (16a) set under the containers of the invention multiple waste fluidizing collectors and the outlet valve (16b) set at the end of the pipeline, controlling by the management house (14), alternatively opening each of the automatic outlet valves (215), (16a) and turning the outlet valve (16b) to the correspond regional collect tanks (4a), (4b) and (4), the pumps and suctions drive and transport the fluidized waste particle and jam respectively going into regional collect tank (4a), (4b) and (4) that getting the renewable uniform wastes without plastic package.

5. The method of claim 1 wherein respectively transporting the renewable uniform wastes going to correspond recycle plants for recycle achieved by transporting through the pipeline (3) with pumps (5a) and the vehicles (5b), the fluidized waste (a), the plastic waste and waste (b), the paper waste, respectively going to the recycle plants (15a) and (15b) for recycle, the fluidized waste (c), the biodegradable waste particle and jam going to the methane generating pools for methane the dreg respectively transported to farm and garden (11) for both underground and surface irrigation, and further going to dewater chamber which dewatered by the gravity compress filter dewater chambers (12) for organic fertilizer.

6. The invention apparatus of claim 2 wherein the fluidizing assembly (208) of the multiple waste fluidizing collector comprises: the multiple function and high effective parts assembled to fluidize different wastes, the plural flexible arc infeeding blades (208a), the hammering balls (208b) are jointed by the rotatable shafts (208c) which are equiangular fixed on the disk (208d), and the plural equiangular fixed rotating vertical blades (208e), the indention edge and serration surface grinding disk (208f), the plural equiangular fixed, flexible baffles and cuts (208g) are formed the flexible assemble to anti mechanic jam and cut, shred, hammer and grind the wastes into flowable particle, further cutting and controlling the granularity of the fluidized waste by the low indent cut and screen (208h), the fixed screen and cut ring (506), that gets the uniform waste particle with designed granularity.

7. The invention apparatus of claim 2 wherein the multiple waste fluidizing collector, two and more of the multiple waste fluidizing collectors can be combined together for specified and multiple use.

8. The invention apparatus of claim 1 wherein the gravity compress filter dewater chamber in claim 1 comprises: the cylinder (402) which formed by the joint (406) and the holding frame (407), the wastewater in the dreg forced by the gravity and passing through the filter wall (403) going into the wastewater collector (404), the odor is protected by the de-odor chamber (405), the dewater chamber can be used for both methane generating pool and the dreg dewater chamber.

* * * * *